June 12, 1956  J. W. LEBOLD  2,750,133
ALIGHTING GEAR FOR VERTICALLY ARISING AIRCRAFT
Filed March 28, 1951  2 Sheets-Sheet 1
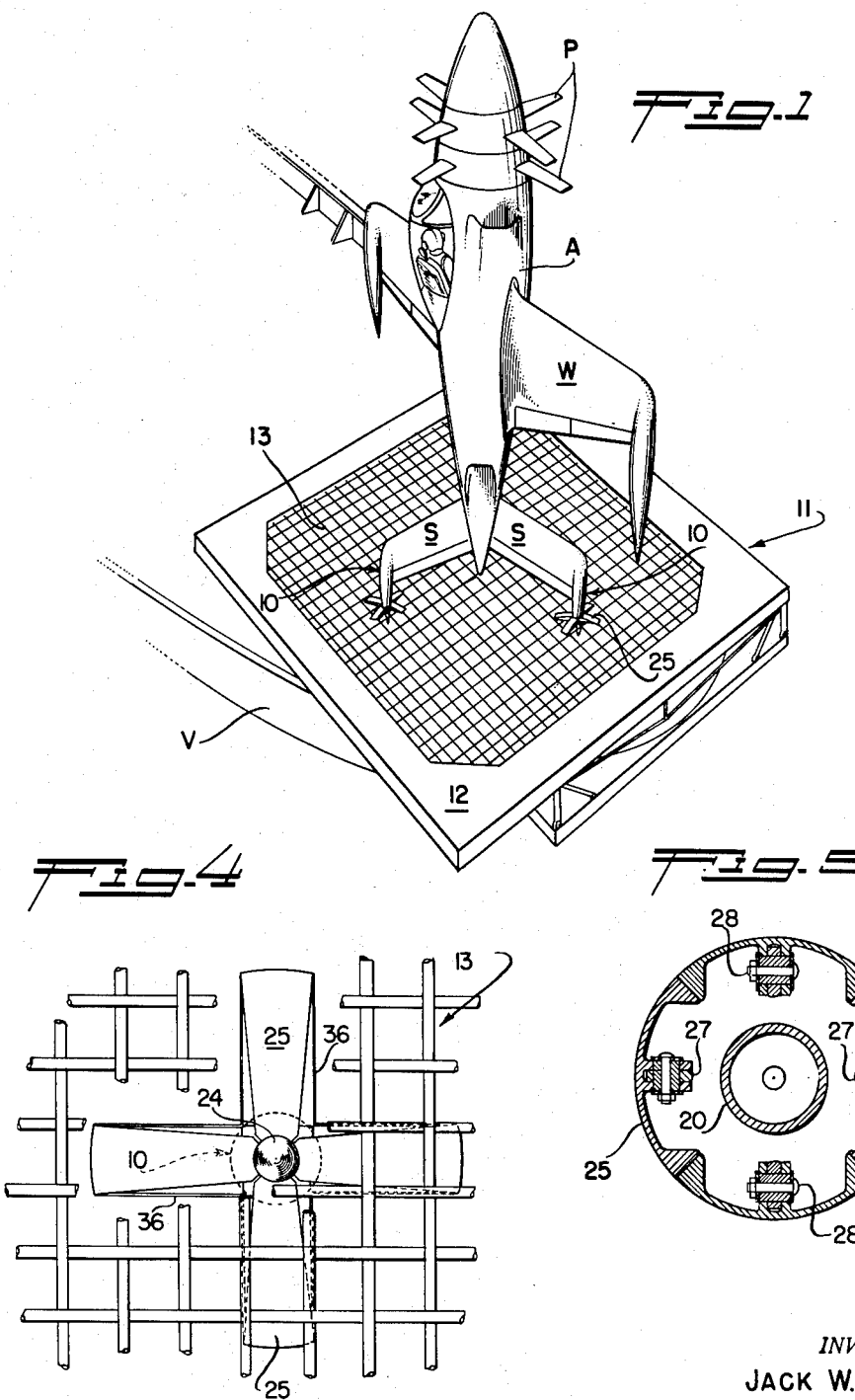
INVENTOR.
JACK W. LEBOLD
BY
Agent

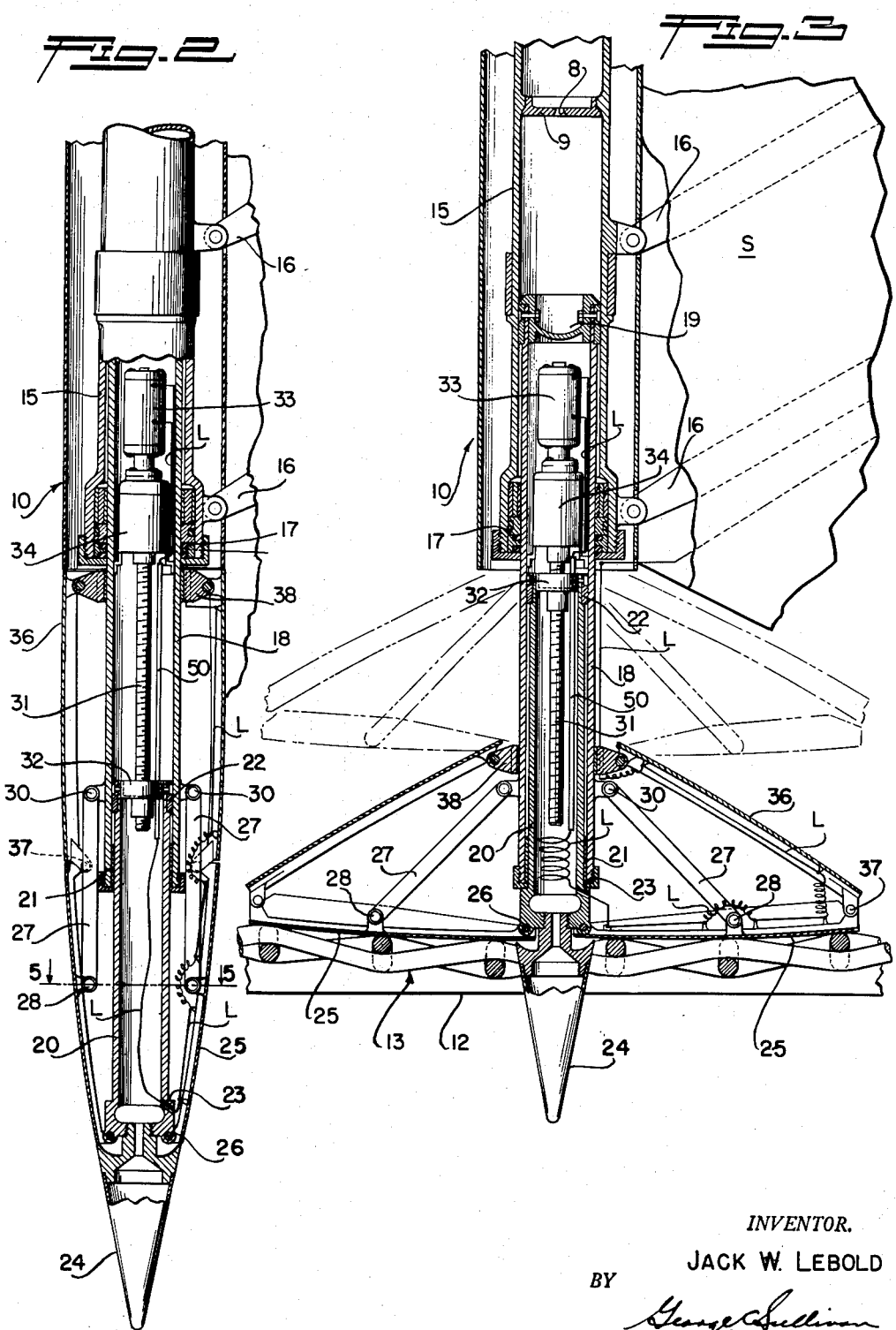

ced June 12, 1956

2,750,133

ALIGHTING GEAR FOR VERTICALLY ARISING AIRCRAFT

Jack W. Lebold, Los Angeles, Calif., assignor to Lockheed Aircraft Corporation, Burbank, Calif.

Application March 28, 1951, Serial No. 217,974

7 Claims. (Cl. 244—100)

This invention relates to aircraft and relates more particularly to landing gear for aircraft designed to rise vertically during the take-off and designed to drop a short distance vertically after a generally horizontal landing approach to a position directly above the landing area.

In the co-pending application of Willis M. Hawkins, Jr., and Eugene C. Frost, Serial No. 395,108, filed November 30, 1953, there is disclosed apparatus and procedures for facilitating the vertical take-off of highly powered aircraft and the landing of the same on a landing net, or the like, of limited area. In the landing procedure the aircraft is maneuvered from a normal flight attitude, through a transition approach toward the landing facilities, to a vertical attitude above the net with its empennage facing downwardly and is then allowed or caused to "drop" downwardly to land upon its tail, the empennage surfaces serving to support the landed airplane on the net. The present invention is directed to landing provisions on the empennage or tail of such an airplane for preventing the tail from penetrating the landing net and for absorbing the shock which may accompany the landing of the airplane.

It is a general object of the present invention to provide simple, practical and dependable alighting gear of this character.

Another object of the invention is to provide landing gear of this class that is retractable for normal flight to a condition where it offers a minimum of aerodynamic drag and that is extensible preparatory to landing of the airplane to positions where it presents adequate surfaces or areas for contacting the landing net to arrest downward sinking of the airplane as it lands and to thereafter support the airplane in the vertical attitude. The landing gear may be incorporated in streamlined pods on the tips of the vertical and horizontal surfaces or stabilizers of the empennage and is such that its net engaging arms or pads fold together when retracted to form portions of the skins of the pods and are shaped to constitute flush or faired in extensions of the skins where they offer little or no aerodynamic drag during flight of the airplane. However, when extended the pads or feet project laterally or generally horizontally from the aft ends of the tip pods to constitute series of relatively large spaced feet for landing on the net or other landing facility.

Another object of the invention is to provide landing gear of the character described in which the plurality of feet or pads on the vertical and horizontal tail surfaces provide an effective "foot print" for the airplane, the landing unit on each tail surface including, say, four spaced and radiating landing pads and the plurality of units being spaced and related to offer or provide a high degree of stability for the vertically positioned airplane to resist tipping or falling of the same. In addition to the radially projecting pads, each landing unit includes a rearwardly or downwardly projecting central point which is adapted to enter or penetrate the net and these points together with the spaced sets of feet or pads dependably support the airplane against displacement and tipping under the influence of wind and/or the pitching, rolling, or the like, of the net in instances when the landing net is on a water borne craft or vessel.

A further object of the invention is to provide landing gear of the character mentioned in which each unit or assembly includes a shock absorbing means for reducing the load factors to be assumed by their respective empennage surfaces and to prevent damage to the airplane upon landing of the same.

A still further object of the invention is to provide landing gear of this type wherein the retractable and extensible landing facilities and shock absorbing means therefore are constructed, assembled and related to normally occupy a minimum of space in the tip pods of the empennage and to be relatively light in weight and yet adequately strong for the purposes for which they are designed.

Other objectives and features of the invention will become apparent from the following detailed description of a typical preferred embodiment wherein:

Figure 1 is a perspective view of an airplane equipped with the alighting gear of the invention and in the vertical attitude on a landing net preparatory to taking off or following a landing;

Figure 2 is an enlarged longitudinal detailed sectional view of one of the landing gear assemblies or units and adjacent portions of the empennage tip pod showing the parts in the retracted positions;

Figure 3 is a view similar to Figure 2 showing the feet or pads in the extended positions with broken lines indicating the positions that may be assumed by the parts at the extreme stroke of the shock absorber;

Figure 4 is a bottom elevation of one of the landing gear units engaged on the landing net with portions of the net broken away; and Figure 5 is an enlarged transverse sectional view taken as indicated by line 5—5 on Figure 2.

The landing gear of the invention may, of course, be employed on aircraft varying considerably in type and intended use and may be employed to facilitate the landing of aircraft on "fields" or landing areas of different characters. In the typical case illustrated the landing gear is shown incorporated in an airplane A having three tail surfaces S. The surfaces S project or radiate from the body or fuselage of the airplane at its aft end and are provided at their tips with what I will term pods 10. These pods 10 project rearwardly from the tips of the stabilizers S and are hollow at least at their aft regions to receive elements of the landing gear. The airplane also has wings W and dual counterrotating propellers P which may be driven by internal combustion turbine engines, although the present invention is not primarily concerned with the mode of propelling the airplane.

The particular landing facilities illustrated in Figure 1 include a generally horizontal platform 11 mounted on the afterdeck of a vessel V. The platform 11 includes a rectangular frame or apron 12 carrying a net 13. While the net 13 is tautly secured in the platform 11 it is capable of absorbing a substantial proportion of the shock which may accompany landing of the airplane, being formed of steel cables or the like having some flexibility and resiliency.

In accordance with the invention the tip pod 10 of each tail surface S is preferably provided with a retractable alighting unit and shock absorbing assembly or combination. As these assemblies may be identical I will proceed with a detailed description of one of them, it being understood that such description is equally applicable to the others.

Each alighting gear assembly or unit includes a cylinder 15 arranged longitudinally in its respective tip pod 10 to be substantially vertical when the airplane A is in the vertical attitude. The cylinder 15 may be supported or mounted by struts or beams 16 extending from the structure of the tail surface S. The upper end of the cylinder 15 is closed while the lower end which is adjacent the lower end of the pod structure has a packing means 17 slidably passing a hollow or tubular piston tube 18. The piston tube 18 has a closed piston head 19 on its upper end slidably operating in the cylinder 15. The cylinder 15 above the piston head 19 contains air and a liquid such as oil. An orifice plate 9 having a restricted orifice 8 is secured in the cylinder 15 to control the displacement of fluid from above the piston head and thus provide the desired movement damping or shock absorbing action. As illustrated in Figures 2 and 3 the piston tube 18 is sufficiently long to extend a substantial distance beyond the lower end of the cylinder 15.

The piston tube 18 of the shock absorbing means carries the net or "field" engaging means of the alighting gear. This latter means includes a tube 20 slidable in a bushing 21 in the lower end of the piston tube 18 and provided at its upper end with a collar or bearing 22 for sliding in the piston tube. The lower end of the tube 20 is enlarged to present and upwardly facing annular shoulder 23 and a point 24 is secured on the lower end of the tube. As shown in Figure 3 the shoulder 23 is adapted to engage the lower end of the piston tube 18 to limit the upward travel of the tube 20 in the piston tube. The point 24 which is adapted to enter the net 13 to assist in retaining or stabilizing the airplane A is a conical part having a slightly rounded lower extremity.

The alighting unit or assembly further includes a plurality of fingers or pads 25 hinged or pivoted on the enlarged lower end of the tube 20 at 26. The pads 25 are mounted and arranged to be movable between the retracted positions of Figure 2 where they lie generally axially of the tube 20 and extended positions where they project radially or generally horizontally from the tube. Links 27 are hinged or pivoted to the inner sides of the pads 25 at 28 and the upper ends of the links are pivoted to the exterior of the piston tube 18 at 30. Means is provided for moving the tube 20 axially relative to the piston tube 18 to extend and retract the pads 25. This means may take the form of an electrically actuated screw jack including a rotatable screw 31 threaded through a nut 32. The nut 32 is fixed in the upper end of the tube 20 and the screw 31 extends axially of the tube assembly. The screw 31 is driven or rotated by a reversible electric motor 33 driving through a speed reduction gear box 34. The motor and gear box unit 33—34 is secured in the piston tube 18. The energizing leads L for the motor 33 extend through a tube 50 which slidably passes down through the nut 32 and the wires pass out through an opening in the lower end of the tube 20 to one of the pads 25. The leads L continue along the inner side of the pad 25 and its extension 36 to pass into the pod 10 and into the airplane proper where they are connected with a power source, not shown. The motor may be controlled from the cockpit of the airplane A by any appropriate means. It will be seen that upon upward movement of the tube 20 from the position of Figure 2 by the action of the screw 31, actuated by the motor 33, the fingers or pads 25 are swung outwardly and downwardly to positions such as shown in Figure 3 where they are adapted to engage the landing net 13. When the pads 25 are fully extended the shoulder 23 engages the lower end of the piston tube 18 to transmit the landing loads directly to the shock absorbing mechanism. Upon operation of the motor 33 in the opposite direction the tube 20 is moved downwardly to again retract the pads 25 to the positions of Figure 2 where the links 27 may engage the lower end of the tube 18 to stop and position the pads.

In accordance with the invention, the fingers or pads 25 are preferably curved or segmental in transverse cross section and are shaped and constructed so as to constitute a tapering tubular assembly when in the retracted position of Figure 2. Figure 5 of the drawings illustrates this configuration and relationship of the pads 25 where it will be seen that the margins of the pads are internally thickened or reinforced. As shown in Figure 2, the tubular assembly of the retracted pads 25 tapers downwardly in such a manner that its external surface merges with or fairs into the external contour of the point 24.

It is preferred to fair in the space between the upper end of the retracted fingers 25 and the lower end of the tip pod 10. Each pad 25 has an extension 36 hinged to its upper end at 37. The upper ends of the extensions 36 are hinged to a sleeve 38 which in turn is slidable on the piston tube 18. With the parts in the retracted positions, the sleeve 38 is at the lower end of the cylinder 15 and upon extension of the pads 25 the sleeve moves downwardly on the tube 18. The pad extensions 36 are segmental in transverse cross section being similar in shape to the pads 25 and when retracted form a tubular assembly extending downwardly from the lower end of the pod 10 to the upper ends of the pads 25. It will be seen from an inspection of Figure 2 that the retracted pads 25 and their extensions 36 smoothly fair in the space between the lower end of the pod 10 and the point 24 to complete the streamlined pod assembly and to materially reduce the aerodynamic drag during flight.

It is believed that the operation of the alighting gear of the invention will be understood from the foregoing description. When the airplane A is at rest on the net 13 the points 24 are engaged in the net and the pads 25 bear on the net to support the airplane. With the airplane in such a static condition the shock absorbing piston tube 18 is neither fully extended nor fully retracted but is in an intermediate position where the pads 25 are spaced some distance below the lower end of the cylinder 15. The airplane A is stabilized against tipping and displacement by the points 24 and pads 25 of the widely spaced alighting gear units on the plurality of surfaces S of the empennage. It will be observed that the pluralities of pads 25 present a considerable aggregate contact area with the net 13 so as to effectively distribute the loads on the net.

Upon taking off the airplane A is adapted to rise vertically or substantially vertically from the net 13, the points 24 and pads 25 offering no interference to the taking off of the airplane. After taking off the motors 33 are energized to move the tubes 20 of the several alighting gear units downwardly and thus retract the pads 25 and their extensions 36 to the axially aligned positions of Figure 2 where they together constitute streamlined fairings for the aft portions of the tip pod 10. Thus during flight of the airplane A the retractable landing gear units offer little or no aerodynamic drag. Preparatory to landing the motors 33 are energized to move the tubes 20 upwardly or inwardly and thus extend the pads 25 to their operative projecting positions such as shown in Figure 3. When the airplane A is to land it is brought to a vertical attitude a short distance over the net 13 with its empennage facing downwardly and the propulsive or sustaining power is then cut or reduced so the airplane moves downwardly or "drops" on to the net 13. The points 24 are adapted to enter the perforations of the net 13 while the fingers or pads 25 come into contact with the upper surface of the net. Upon this contact of the alighting gear with the net 13 the piston tubes 18 are adapted to have relative movement with respect to their cylinders 15, this relative movement being accompanied by the controlled displacement of fluid through the orifices 8 which dampens or absorbs the shock accompanying landing of the airplane. As previously pointed out the net 13 also absorbs, to some extent, the shock of landing. Thus, the alighting gear of the invention incorporates pluralities of widely spaced contact pads 25 for engaging the net or other "field" which are carried by shock absorbing cylinder and piston devices to reduce the shock and prevent damage to the airplane. The landing gear units are self-contained or complete in themselves and are capable of being housed in or associated with the streamlined tip pods 10 or the like of the airplane empennage.

Having described only a typical form of the invention, I do not wish to be limited to the specific details herein set forth, but wish to reserve to myself any variations or modifications that may appear to those skilled in the art and/or fall within the scope of the following claims.

I claim:

1. In an aircraft having a fuselage and tail surfaces on the fuselage, the combination of a pod on each tail surface, a cylinder and piston shock absorbing device in each pod having a part movable fore and aft, a plurality of landing pads, a member movable axially in each part, means pivotally connecting the lower ends of the pads with the members, links connecting the pads with said parts, and means for moving said members to move the pads between retracted fore and aft positions and positions where they project laterally with respect to the fore and aft direction.

2. Landing gear for a stabilizer of an aircraft comprising a shock absorber cylinder arranged fore and aft on the stabilizer, a piston tube operable in the cylinder and extending from the aft end thereof, a member movable axially in the tube, landing pads having lower ends pivoted to the member, links pivotally connected between the piston tube and pads, and means for moving said member axially to swing the pads between positions generally parallel with the piston tube and positions projecting laterally from said member.

3. Landing gear for a stabilizer of an aircraft comprising a shock absorber cylinder arranged fore and aft on the stabilizer, a piston tube operable in the cylinder and extending from the aft end thereof, a member movable axially in the tube, a landing point on the lower end of said member, landing pads having lower ends pivoted to the member, links extending between and pivotally connected with the piston tube and pads, and means for moving said member axially to swing the pads between positions generally parallel with the piston tube and positions projecting laterally from said member.

4. The combination of a tail surface of an aircraft, a pod on the tail surface elongated fore and aft of the aircraft and of streamlined configuration, the pod terminating at its aft end in a plane transverse of its fore and aft axis, and a landing gear unit carried by the pod including a shock absorber cylinder secured in the pod, a shock absorbing piston tube operable in the cylinder and extending from the aft end of the pod, a member movable axially of the tube, field-engaging parts secured to the member to be movable, upon movement of the member, between retracted positions where they extend axially aft as extensions of the streamlined configuration of the pod and extended positions where they project substantially normal to said axis, and means for moving the member.

5. The combination of a tail surface of an aircraft, a pod on the tail surface elongated fore and aft of the aircraft and of streamlined configuration, the pod terminating at its aft end in a plane transverse of its fore and aft axis, and a landing gear unit carried by the pod including a shock absorber cylinder secured in the pod, a shock absorbing piston tube operable in the cylinder and extending from the aft end of the pod, a member movable axially of the tube, field-engaging parts hinged to the lower end of the member and linked to the piston tube to be movable between retracted positions and extended positions where they project laterally from the lower end of member to present alighting surfaces, the members being constructed and arranged to constitute a tapering tubular assembly when in the retracted positions, extensions for the upper ends of said parts forming a tubular fairing between the aft end of the pod and said tubular assembly when said parts are in the retracted positions, and means for moving the member to extend and retract said parts.

6. In an aircraft having a fuselage provided with fixed tail surfaces, the combination of; a landing gear on each surface, each landing gear including a pod on its respective tail surface, shock absorbing means in the pod, a member carried by the shock absorbing means for fore and aft movement therein and extending from the aft end of the pod, a field penetrating point on the aft end of the member, a set of landing pads pivotally connected with the shock absorbing means, operative connections between the pods and said member whereby the pods are movable from retracted positions where they constitute a fore and aft fairing on the aft end of the pod and active laterally projecting positions upon movement of the member in the shock absorbing means, the pads presenting broad aft facing field engaging surfaces when in the active positions, and power-actuated jack means in the shock absorbing means for moving the member to actuate the pads between said retracted and active positions.

7. In an aircraft having a fuselage provided with fixed tail surfaces, the combination of; a landing gear on each surface, each landing gear including a pod on its respective tail surface, shock absorbing means in the pod, a set of landing feet pivotally connected with the shock absorbing means, a member movable with respect to the shock absorbing means, a field penetrating point on the member to move therewith, pivotal connections between the feet and the member, said connections being adjacent the point, and motor actuated screw-jack means carried in the shock absorbing means for moving the member with respect thereto to move the feet between retracted positions where they extend fore and aft of their respective pod and active positions where they extend laterally from said connections adjacent the point, the feet presenting broad aft facing field engaging surfaces when in said active positions.

References Cited in the file of this patent

UNITED STATES PATENTS

| | | |
|---|---|---|
| 1,257,413 | Sloper | Feb. 26, 1918 |
| 1,378,114 | Hewitt | May 17, 1921 |
| 1,882,416 | Gastwirth | Oct. 11, 1932 |
| 1,951,817 | Blount | Mar. 10, 1934 |
| 2,043,704 | McPherren | June 9, 1936 |
| 2,308,802 | Barling | Jan. 19, 1943 |
| 2,387,762 | Leonard | Oct. 30, 1945 |
| 2,397,632 | Stuart | Apr. 2, 1946 |
| 2,421,870 | Dornier | June 10, 1947 |
| 2,479,125 | Leonard | Aug. 16, 1949 |
| 2,578,578 | Meyers | Dec. 11, 1951 |